United States Patent

Castillo, Jr.

Patent Number: 5,312,641
Date of Patent: May 17, 1994

[54] NON-SPREAD PEANUT BUTTER SLICES AND METHOD OF MAKING

[75] Inventor: Ruben Castillo, Jr., Corpus Christi, Tex.

[73] Assignee: Celso Rodriguez, Corpus Christi, Tex.

[21] Appl. No.: 944,541

[22] Filed: Sep. 14, 1992

[51] Int. Cl.⁵ .............................. A23L 1/38
[52] U.S. Cl. .................... 426/633; 426/119; 426/125; 426/274; 426/516; 426/517; 426/518; 426/558; 426/654; 426/658
[58] Field of Search ............... 426/633, 516, 517, 518, 426/558, 93, 94, 119, 125, 274, 654, 658

[56] References Cited

U.S. PATENT DOCUMENTS

| | | | |
|---|---|---|---|
| 1,060,912 | 5/1913 | Lasby | 426/633 |
| 2,131,064 | 9/1938 | Musher | 426/633 |
| 3,772,038 | 11/1973 | Ayres et al. | 426/633 |

Primary Examiner—Helen Pratt
Attorney, Agent, or Firm—Daniel Vera

[57] ABSTRACT

A non-spread, sliced peanut butter product containing chunky peanut butter, powdered egg white, flour, and an emulsifier. The ingredients are mixed together, pressed or extruded into sheets which are separated by waxed paper into pieces the size of a bread slice and about 0.2 inches thick.

2 Claims, No Drawings

NON-SPREAD PEANUT BUTTER SLICES AND METHOD OF MAKING

BACKGROUND OF THE INVENTION (1.) Field of Invention
Classification: Food 426.
(2.) Background Art The present invention relates to a new composition of peanut butter, and more particularly to a peanut spread which is in the shape of an approximate square slice of typical white bread and is nonsticky relative to its' packaging, thus allowing it to be easily removed from its ' package and placed directly onto a slice of fresh white bread. Thus, it eliminates the need for spreading. This composition also retains excellent peanut butter taste and texture. Refrigeration is not necessary but not harmful to the composition's general quality. The advantage is that cold or room temperature peanut spread can be stored in preformed slices and applied to a slice of soft fresh bread and not damage the bread or other type of spread support such as a cracker or cake.

Shape retaining peanut spreads are known in the art however the inventor feels his composition is distinct in that the limited stickiness and specific shape of the spread is not addressed in those inventions. See, U.S. Pat. No. 3,044,883. E. Ferguson.

BRIEF SUMMARY OF INVENTION

This invention relates to a peanut food manufacture wherein by mixing with other ingredients and packaging in separate manner, sliced peanut butter is provided, thus eliminating the need for spreading, as is typically done on white bread, and providing a method of convenient storage and distribution of the peanut butter.

BEST MODE FOR CARRYING OUT THE INVENTION

One ounce of chunky peanut butter is mixed with 0.25 ounce powdered egg white, 1 ounce of flour and 0.25 ounce of an edible emulsifier such as Surfax TM . The above ingredients are mixed into a dough and then pressed or extruded or otherwise formed into sheets about 0.2 inches thick and about the height and width of a typical slice of soft white bread. The resulting sheets are then stacked and separated from each other with waxed paper or the like. The prepared slices can then be stored as sliced peanut butter which can easily be separated and handled in slice form similar to the way sliced cheese may be handled.

DETAILED DESCRIPTION

About 1 ounce of chunky or regular peanut butter is mixed with about from 0.375 ounce to about 0.625 ounces egg white powder and from about 0.75 ounce to about 1.25 ounce flour and 0.25 ounce of an edible emulsifier such as Surfax, TM . The ingredients are thoroughly mixed and the resulting dough may be shaped by any suitable method such as pressing or extruding to produce flat shaped slices of peanut butter. The slices are then stored separate from each other in single wrapped slices such wrapping may be waxed paper or plastic wrapping paper material or the like.

What is claimed is:

1. Peanut butter slices, each consisting essentially of pressed dough, said dough further consisting essentially of one ounce of chunky peanut butter mixed with 0.25 ounce powdered egg white, 1 ounce of flour and 0.25 ounce of an edible emulsifier, mixing said ingredients into a dough then, pressing or extruding said dough into uniform sheets or slices about 0.2 inches thick and about the height and width of a typical slice of soft white bread.

2. The production of peanut butter slices by the method consisting essentially of mixing about 1 ounce of chunky or regular peanut butter with about from 0.375 ounce to about 0.625 ounces egg white powder and from about 0.75 ounce to about 1.25 ounce flour, and from about 0.10 ounce to about 0.35 ounce of an edible emulsifier; said ingredients are thoroughly mixed into a dough, said dough is shaped by pressing or extruding to produce flat shaped slices of peanut butter about 0.2 inches and the height and width of a typical slice of soft white bread, said slices are then stored separately from each other in single wrapped slices such wrapping may be from the group consisting of waxed paper, plastic wrap and a combination thereof.

* * * * *